US008786813B2

(12) United States Patent
He et al.

(10) Patent No.: US 8,786,813 B2
(45) Date of Patent: Jul. 22, 2014

(54) LIQUID CRYSTAL DISPLAY AND PIXEL UNITS THEREOF

(75) Inventors: Chengming He, Shenzhen (CN); Liangchan Liao, Shenzhen (CN); Dongsheng Guo, Shenzhen (CN); Chihsien Li, Shenzhen (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 262 days.

(21) Appl. No.: 12/996,297

(22) PCT Filed: Sep. 1, 2010

(86) PCT No.: PCT/CN2010/076536
§ 371 (c)(1),
(2), (4) Date: Dec. 3, 2010

(87) PCT Pub. No.: WO2012/012955
PCT Pub. Date: Feb. 2, 2012

(65) Prior Publication Data
US 2012/0026437 A1 Feb. 2, 2012

(30) Foreign Application Priority Data
Jul. 29, 2010 (CN) .......................... 2010 1 0245373

(51) Int. Cl.
*G02F 1/1343* (2006.01)
*G02F 1/1337* (2006.01)
*G02F 1/1335* (2006.01)

(52) U.S. Cl.
USPC ............ 349/144; 349/108; 349/139; 349/143

(58) Field of Classification Search
CPC ................................................ G02F 1/134309
USPC .................. 349/106–108, 110, 129, 139–144
See application file for complete search history.

(56) References Cited

U.S. PATENT DOCUMENTS

| 6,922,183 | B2* | 7/2005 | Ting et al. ..................... 349/123 |
| 7,259,811 | B2 | 8/2007 | Kim | |
| 7,812,896 | B2* | 10/2010 | Su et al. .......................... 349/48 |
| 2002/0149598 | A1 | 10/2002 | Greier et al. | |
| 2007/0165179 | A1 | 7/2007 | Jang | |
| 2007/0206135 | A1* | 9/2007 | Manabe et al. ............... 349/106 |
| 2007/0216844 | A1* | 9/2007 | Chin et al. .................... 349/144 |
| 2009/0096950 | A1* | 4/2009 | Kim et al. ....................... 349/43 |
| 2009/0262100 | A1* | 10/2009 | Su et al. ......................... 349/37 |

FOREIGN PATENT DOCUMENTS

| CN | 1556421 A | 12/2004 |
| CN | 1940646 A | 4/2007 |
| CN | 101021636 A | 8/2007 |
| CN | 101029944 A | 9/2007 |
| CN | 101153932 A | 4/2008 |
| CN | 100523929 C | 8/2009 |
| CN | 100547640 C | 10/2009 |
| CN | 201383061 Y | 1/2010 |
| WO | 2010073693 A1 | 7/2010 |

* cited by examiner

*Primary Examiner* — Dung Nguyen
(74) *Attorney, Agent, or Firm* — Sughrue Mion, PLLC

(57) ABSTRACT

The present invention provides a liquid crystal display and pixel units thereof. The pixel unit has a plurality of subpixel units, and each of the subpixel units is a rectangular block, and the rectangular block is divided into a triangular bright-partition and a triangular dark-partition along an inclined line, and the bright-partition of each subpixel unit corresponds to the dark-partitions of adjacent subpixel units, so as to reduce jagged phenomenon of lines in screen images with the configuration of the pixel unit, and thereby enhance image quality of the liquid crystal display.

20 Claims, 3 Drawing Sheets

LIQUID CRYSTAL DISPLAY AND PIXEL UNITS THEREOF

FIELD OF THE INVENTION

The present invention relates to a liquid crystal display, and more particularly to a liquid crystal display and pixel units thereof that achieve an objective of enhancing image quality of the liquid crystal display by the configuration of the pixel units.

BACKGROUND OF THE INVENTION

Liquid crystal displays have a color-shift phenomenon that comes along with the increase in view angle. Presently large-sized liquid crystal display manufacturers have several solutions for solving the color-shift problem in large view angle. One common solution is referring to FIG. 1, and FIG. 1 discloses a schematic view of partial configuration of pixel units of a conventional liquid crystal display which comprises a display area 90 and a plurality of pixel units 91, wherein the pixel units 91 are arranged in the display area 90 in a two-dimensional matrix arrangement, wherein each of the pixel units 91 has three subpixel units 910 controlling three primary colors of red, green and blue, respectively. Each of the subpixel units is divided along a horizontal line 900 into a square bright-partition 910A and a square dark-partition 910B, wherein the division is achieved by varying alignment direction of liquid crystal molecules under the bright-partition 910A and the dark-partition 910B, wherein when a display circuit of the liquid crystal display controls the pixel unit 91 for displaying gray-scale, the light flux in the bright-partition 910A differs from the light flux in the dark-partition 910B, wherein each of the bright-partitions 910A is brighter than each of the dark-partitions 910B. Under different view angles of the liquid crystal display, the bright-partition 910A and the dark-partition 910B perform a mixed brightness that is basically the same as the screen brightness we face the liquid crystal display squarely, so as to solve the color-shift problem.

However, for the foregoing alignment-division, with the increase of panel size, the sizes of the pixel units 91 increase as well, and human eyes can gradually feel the phenomenon that the brightness performed by the bright and the dark partitions is not even in some frames, then cause an influence on overall image quality. And some oblique lines have a jagged-shape problem. Take FIG. 2 as an example, FIG. 2 discloses a schematic view of displaying an oblique line 92 using the pixel units 91 in FIG. 1. When the oblique line 92 is displayed in the display area 90, some pixel units 91' simultaneously display black to construct the oblique line 92, and users will see the oblique line 92 in jagged-shape. Affected by the one-dividing-into-two division means, the pixel units 91' that originally display black will be visually bigger to the users due to influence of the dark-partitions 910B' of the adjacent pixel units 91, and will inevitably cause an influence on the image quality.

Hence, it is necessary to provide a liquid crystal display and pixel units thereof to overcome the problems existing in the conventional technology.

SUMMARY OF THE INVENTION

A primary object of the invention is to provide a liquid crystal display, wherein the configuration of pixel units thereof can make brightness of image more even, so as to enhance image quality and reduce jagged phenomenon occurred when displaying oblique lines.

A secondary object of the present invention is to provide a pixel unit, wherein each of subpixel units thereof is constructed of a triangular bright-partition and a triangular dark-partition, and the bright-partition corresponds to adjacent dark-partitions, which is contributive to reduce jagged effect of image display to enhance image quality.

To achieve the above object, the present invention provides a liquid crystal display which has a plurality of pixel units, wherein the pixel units are arranged in a display area in a two-dimensional matrix arrangement, and each of the pixel units has a plurality of subpixel units, wherein each of the subpixel units is a rectangular block, and the rectangular block is divided into a bright-partition and a dark-partition along an inclined line, wherein the bright-partition of each of the subpixel units corresponds to the dark-partitions of the adjacent subpixel units.

In one embodiment of the present invention, each of the pixel units is configured by arranging the subpixel units side by side; the subpixel units are a first subpixel unit, a second subpixel unit and a third subpixel unit, and control display of three primary colors of red, green and blue, respectively.

In one embodiment of the present invention, the subpixel units are arranged side by side to configure the pixel unit.

In one embodiment of the present invention, the inclined line is a diagonal line of the rectangular block; the bright-partition and the dark-partition are triangular.

In one embodiment of the present invention, the bright-partition and the dark-partition are divided according to different alignment directions of liquid crystal molecules.

Furthermore, the present invention provides a pixel unit, and the pixel unit comprises a plurality of subpixel units, and each of the subpixel units is a rectangular block, and the rectangular block is divided into a bright-partition and a dark-partition along an inclined line, wherein the bright-partition of each of the subpixel units corresponds to the dark-partitions of the adjacent subpixel units.

In one embodiment of the present invention, each of the pixel units is configured by arranging the subpixel units side by side; and the subpixel units are a first subpixel unit, a second subpixel unit and a third subpixel unit, which control display of three primary colors of red, green and blue, respectively.

In one embodiment of the present invention, the subpixel units are arranged side by side to configure the pixel unit.

In one embodiment of the present invention, the inclined line is a diagonal line of the rectangular block; the bright-partition and the dark-partition are triangular.

In one embodiment of the present invention, the bright-partition and the dark-partition are divided according to different alignment directions of liquid crystal molecules.

Comparing with the existing techniques, the present invention uses the configuration of the pixel unit to reduce jagged phenomenon of lines in screen images to enhance display image quality of the liquid crystal display.

DETAILED DESCRIPTION OF THE PREFERRED EMBODIMENTS

The foregoing objects, features and advantages adopted by the present invention can be best understood by referring to the following detailed description of the preferred embodiments and the accompanying drawings. Furthermore, the directional terms described in the present invention, such as upper, lower, front, rear, left, right, inner, outer, side and etc., are only directions referring to the accompanying drawings, so that the used directional terms are used to describe and understand the present invention, but the present invention is not limited thereto.

Figure 1:
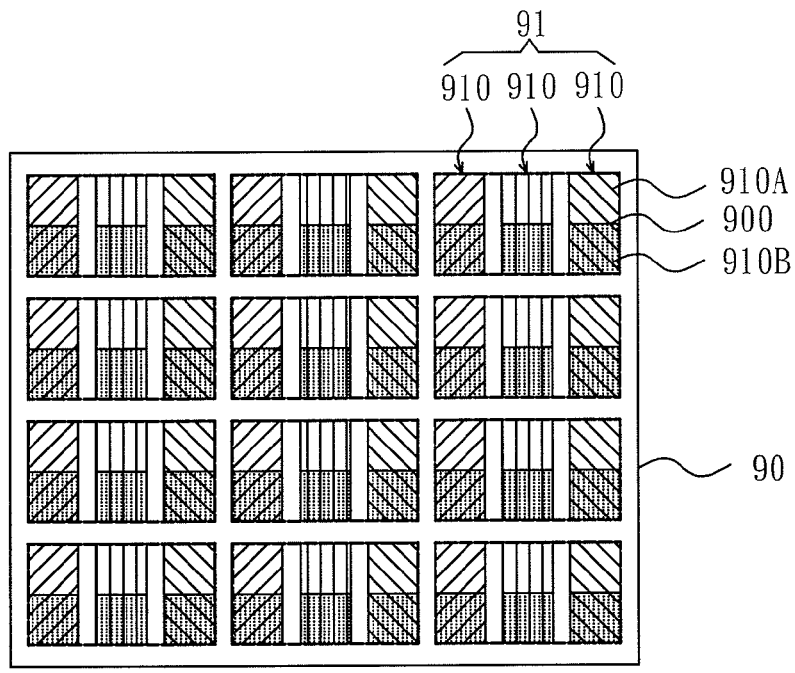
FIG. 1 is a schematic view of arrangement of conventional pixel units of a liquid crystal display.
Figure 2:
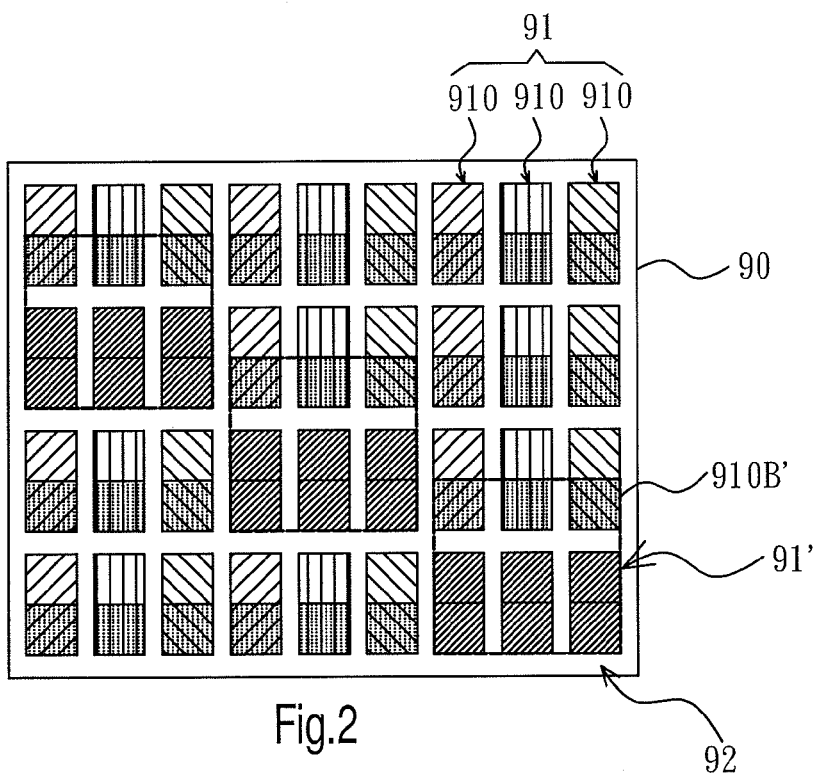
FIG. 2 is a schematic view of pixel units in FIG. 1 displaying an oblique line.
Figure 3:
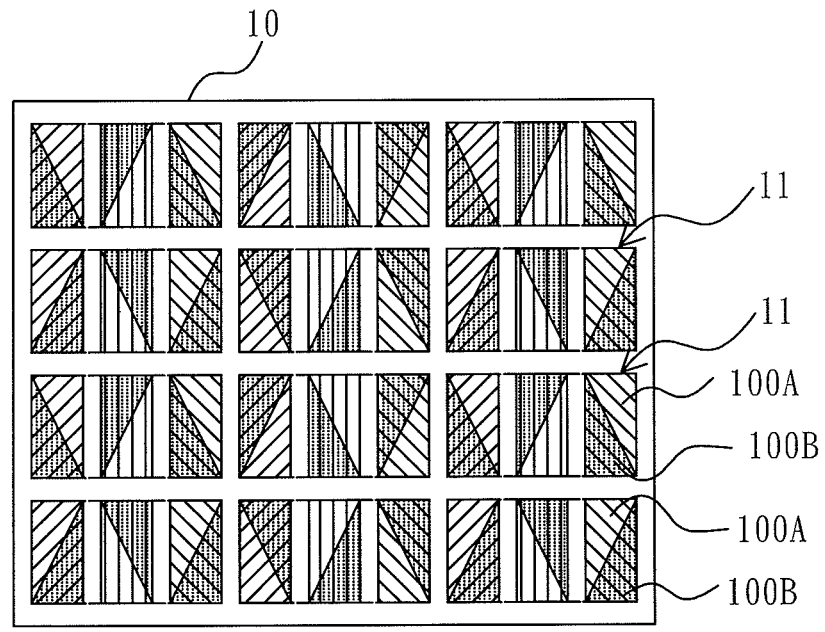
FIG. 3 is a schematic view of arrangement of pixel units of a liquid crystal display according to a preferred embodiment of the present invention.
Figure 4:
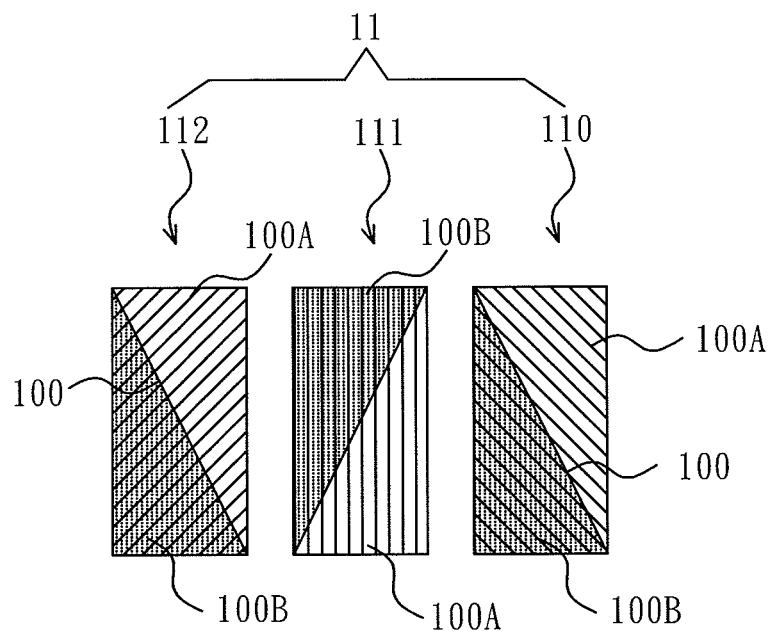
FIG. 4 is a schematic view of configuration of a pixel unit according to a preferred embodiment of the present invention.

With reference to FIG. 3, FIG. 3 discloses a schematic view of arrangements of pixel units of a liquid crystal display according to a preferred embodiment of the present invention. A liquid crystal display comprises a display area 10 and a plurality of pixel units 11, wherein the pixel units 11 are arranged in the display area 10 in a two-dimensional matrix arrangement. With further reference to FIG. 4, FIG. 4 discloses the configuration of the pixel unit 11. Each of the pixel units 11 is configured by a plurality of the subpixel units arranged side by side, in the present embodiment, the subpixel units are a first subpixel unit 110, a second subpixel unit 111 and a third subpixel unit 112 respectively, and control display of three primary colors of red, green and blue, respectively. Each of the subpixel units is a rectangular block, such as an oblong block, a foursquare block and etc. The rectangular block is divided into a bright-partition 100A and a dark-partition 100B along an inclined line 100, and the bright-partition 100A and the dark-partition 100B are divided according to different alignment directions of liquid crystal molecules. The inclined line 100 may be a diagonal line of the rectangular block, and the bright-partition 100A and the dark-partition 100B therefore are triangular.

Besides, the inclined line 100 of each of the subpixel units that divides the bright-partition 100A and the dark-partition 100B is not parallel to the inclined lines 100 of adjacent subpixel units. Therefore, take the inclined line 100 being the diagonal line of the subpixel unit as an example, with reference to FIGS. 3 and 4, it shows that the bright-partition 100A of each of the subpixel units and the dark-partitions 100B of the adjacent subpixel units are corresponding to each other or align with each other, and also can be called symmetric to each other. For example, in a view of the first subpixel unit 110, the bright-partition 100A of the first subpixel unit 110 and the dark-partition 100B of the second subpixel unit 111 are corresponding to each other. In a view of the second subpixel unit 111, the bright-partition 100A of the second subpixel unit 111 not only corresponds to the dark-partition 100B of the first subpixel unit 110, but also corresponds to the dark-partition 100B of the third subpixel unit 112.

Figure 5:
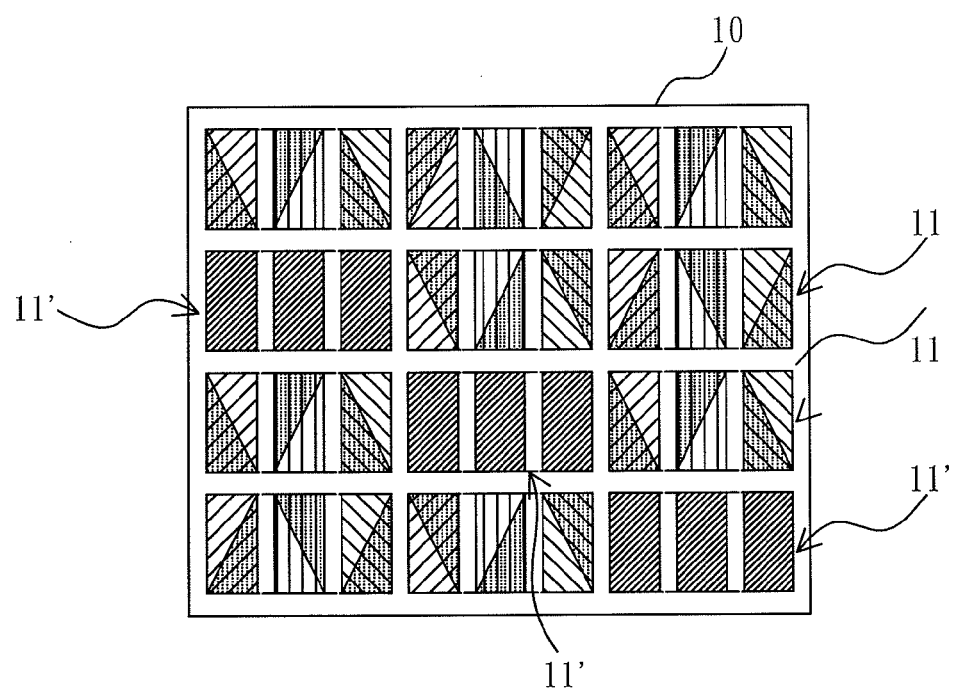
FIG. 5 is a schematic view of pixel units in FIG. 3 displaying an oblique line.

With further reference to FIG. 5, when the liquid crystal display is displaying an oblique line, it shows that the pixel units 11' that display black color to construct the oblique line are relatively not affected to be visually enlarged by the dark-partitions 110B of adjacent pixel units 11, so as to reduce jagged phenomenon of the oblique line.

As mentioned above, comparing with conventional liquid crystal displays using horizontally-divided subpixel units to achieve objective of improving viewing angle phenomenon, with the increase of size of liquid crystal display, such conventional structure using horizontally-division may have shortcomings that jagged phenomenon is more obvious when displaying oblique lines. The liquid crystal display and the pixel units thereof in accordance with the present invention in FIG. 3 that uses an inclined line to divide each subpixel unit of the pixel units 11 into the bright-partition 110A and the dark-partition 110B, so as to indeed effectively reduce the jagged phenomenon for enhancing the image display quality of large-sized liquid crystal displays.

The present invention has been described with a preferred embodiment thereof and it is understood that many changes and modifications to the described embodiment can be carried out without departing from the scope and the spirit of the invention that is intended to be limited only by the appended claims.

The invention claimed is:

1. A liquid crystal display, characterized in that: the liquid crystal display comprises a plurality of pixel units, wherein the pixel units are arranged in a display area in a two-dimensional matrix arrangement, and each of the pixel units has a plurality of subpixel units, and each of the pixel units is configured by arranging the subpixel units side by side, wherein the subpixel units of one of the pixel unit are a first subpixel unit, a second subpixel unit and a third subpixel unit, which control display of three primary colors of red, green and blue, respectively; wherein each of the subpixel units is a rectangular block, and the rectangular block is divided into a bright-partition and a dark-partition along an inclined line, wherein the inclined line is a diagonal line of the rectangular block; the bright-partition and the dark-partition are triangular, wherein the bright-partition of each of the subpixel units symmetrically corresponds to the dark-partition of the adjacent subpixel unit in a longitudinal direction and also symmetrically corresponds to the dark-partition of another adjacent subpixel unit in a transverse direction.

2. A liquid crystal display, characterized in that: the liquid crystal display comprises a plurality of pixel units, wherein the pixel units are arranged in a display area in a two-dimensional matrix arrangement, and each of the pixel units has a plurality of subpixel units, wherein each of the subpixel units is a rectangular block, and the rectangular block is divided into a bright-partition and a dark-partition along an inclined line, wherein the bright-partition of each of the subpixel units symmetrically corresponds to the dark-partition of the adjacent subpixel unit in a longitudinal direction and also symmetrically corresponds to the dark-partition of another adjacent subpixel unit in a transverse direction.

3. The liquid crystal display as claimed in claim 2, characterized in that: each of the pixel units is configured by arranging the subpixel units side by side; and the subpixel units are a first subpixel unit, a second subpixel unit and a third subpixel unit, which control display of three primary colors of red, green and blue, respectively.

4. The liquid crystal display as claimed in claim 3, characterized in that: the bright-partition and the dark-partition are divided according to different alignment directions of liquid crystal molecules.

5. The liquid crystal display as claimed in claim 2, characterized in that: the subpixel units are arranged side by side to configure the pixel unit.

6. The liquid crystal display as claimed in claim 5, characterized in that: the inclined line is a diagonal line of the rectangular block; and the bright-partition and the dark-partition are triangular.

7. The liquid crystal display as claimed in claim 6, characterized in that: the bright-partition and the dark-partition are divided according to different alignment directions of liquid crystal molecules.

8. The liquid crystal display as claimed in claim 5, characterized in that: the bright-partition and the dark-partition are divided according to different alignment directions of liquid crystal molecules.

9. The liquid crystal display as claimed in claim 2, characterized in that: the inclined line is a diagonal line of the rectangular block; and the bright-partition and the dark-partition are triangular.

10. The liquid crystal display as claimed in claim 9, characterized in that: the bright-partition and the dark-partition are divided according to different alignment directions of liquid crystal molecules.

11. The liquid crystal display as claimed in claim 2, characterized in that: the bright-partition and the dark-partition are divided according to different alignment directions of liquid crystal molecules.

12. A pixel unit, characterized in that: the pixel unit comprises a plurality of subpixel units, and each of the subpixel units is a rectangular block, and the rectangular block is divided into a bright-partition and a dark-partition along an inclined line, wherein the bright-partition of each of the subpixel units symmetrically corresponds to the dark-partition of the adjacent subpixel unit in a longitudinal direction and also symmetrically corresponds to the dark-partition of another adjacent subpixel unit in a transverse direction.

13. The pixel unit as claimed in claim 12, characterized in that: the subpixel units are a first subpixel unit, a second subpixel unit and a third subpixel unit, which control display of three primary colors of red, green and blue, respectively.

14. The pixel unit as claimed in claim 13, characterized in that: the subpixel units are arranged side by side to configure the pixel unit.

15. The pixel unit as claimed in claim 14, characterized in that: the inclined line is a diagonal line of the rectangular block; and the bright-partition and the dark-partition are triangular.

16. The pixel unit as claimed in claim 13, characterized in that: the inclined line is a diagonal line of the rectangular block; and the bright-partition and the dark-partition are triangular.

17. The pixel unit as claimed in claim 12, characterized in that: the subpixel units are arranged side by side to configure the pixel unit.

18. The pixel unit as claimed in claim 17, characterized in that: the inclined line is a diagonal line of the rectangular block; and the bright-partition and the dark-partition are triangular.

19. The pixel unit as claimed in claim 12, characterized in that: the inclined line is a diagonal line of the rectangular block; and the bright-partition and the dark-partition are triangular.

20. The pixel unit as claimed in claim 12, characterized in that: the bright-partition and the dark-partition are divided according to different alignment directions of liquid crystal molecules.

* * * * *